(12) United States Patent
Li et al.

(10) Patent No.: US 8,415,850 B2
(45) Date of Patent: Apr. 9, 2013

(54) UNIVERSAL MOTOR

(75) Inventors: Yue Li, Hong Kong (CN); Jian Zhao, Shenzhen (CN); Yong Li, Shenzhen (CN); Yu Li Yang, Shenzhen (CN)

(73) Assignee: Johnson Electric S.A., Murten (CH)

( * ) Notice: Subject to any disclaimer, the term of this patent is extended or adjusted under 35 U.S.C. 154(b) by 146 days.

(21) Appl. No.: 12/948,232

(22) Filed: Nov. 17, 2010

(65) Prior Publication Data
US 2011/0115329 A1 May 19, 2011

(30) Foreign Application Priority Data
Nov. 17, 2009 (CN) .......................... 2009 1 0109742

(51) Int. Cl.
*H02K 23/64* (2006.01)
(52) U.S. Cl.
USPC .................................. 310/158; 310/216.021

(58) Field of Classification Search .................. 310/158, 310/216.021, 216.022, 216.023, 216.024, 310/216.025, 216.028
See application file for complete search history.

(56) References Cited

U.S. PATENT DOCUMENTS

| | | | | |
|---|---|---|---|---|
| 4,390,804 A * | 6/1983 | Orova et al. | ................ | 310/70 R |
| 5,659,218 A * | 8/1997 | Kliman et al. | ......... | 310/216.028 |
| 6,791,225 B2 * | 9/2004 | Campbell et al. | ............. | 310/181 |
| 7,417,347 B2 * | 8/2008 | Lee et al. | ................ | 310/156.46 |

* cited by examiner

*Primary Examiner* — Nguyen N Hanh
(74) *Attorney, Agent, or Firm* — Muncy, Geissler, Olds & Lowe, PLLC

(57) ABSTRACT

A universal motor includes a stator and a rotor rotatable relative to the stator. The stator includes a stator core and winding wound on the stator core. The stator core has an E-shape cross section and comprises a main part and three extension parts extending perpendicularly from the main part. Each extension part has an arc surface. The arc surfaces of the extension parts cooperatively form a space into which the rotor is received.

16 Claims, 2 Drawing Sheets

UNIVERSAL MOTOR

CROSS REFERENCE TO RELATED APPLICATIONS

This non-provisional patent application claims priority under 35 U.S.C. §119(a) from Patent Application No. 200910109742.7 filed in The People's Republic of China on Nov. 17, 2009, the disclosure of which is fully incorporated herein by reference

FIELD OF THE INVENTION

This invention relates to universal motors and in particular, to a universal motor having an E-shaped stator core.

BACKGROUND OF THE INVENTION

FIG. 3 shows a conventional two-pole universal motor which comprises a stator and a rotor. The stator comprises a C-shaped stator core and winding wound on the stator core. When the winding is electrified, the stator forms two magnetic poles. A conventional four-pole universal motor (not shown) usually needs an enclosed stator core which may be divided into two C-shaped parts respectively located at opposite sides of the rotor. Thus a two pole motor can not operate as a four pole motor and the four pole motor is limited in how close the output shaft can be to a wall of an appliance in which the motor is fitted due to the presence of the stator core surrounding the rotor.

The present invention is desired to provide a new type of stator core and universal motor using the type of stator core.

SUMMARY OF THE INVENTION

Hence there is a desire for a new type of stator core and universal motor using this new type of stator core giving greater freedom in the design of the appliance using the motor.

This is achieved in the present invention by using an E-shaped stator core.

Accordingly, in one aspect thereof, the present invention provides a universal motor comprising: a stator comprising a stator core and a winding wound on the stator core; and a rotor rotatable relative to the stator; wherein the stator core has an E-shape cross section and comprises a main part and three extension parts extending from the main part in the same direction, each extension part having an arc surface, the arc surfaces of the extension parts cooperatively forming a space into which the rotor is received.

Preferably, the arc surfaces are coaxial with the rotor.

Preferably, the extension parts comprise a middle extension part extending from a middle position of the main part, and two side extension parts respectively extending from opposite ends of the main part.

Preferably, the winding is a single coil disposed about the middle extension part.

Preferably, the winding comprises two coils respectively disposed about the side extension parts.

Preferably, the middle extension part is shorter than the side extension parts.

Preferably, the width of the middle extension part is substantially equal to the widths of the side extension parts added together.

According to a second aspect, the present invention provides a stator core for a universal motor, comprising a main part and three extension parts extending from the main part in the same direction and giving the stator core an E-shape cross section, each extension part having an arc surface, the arc surfaces cooperatively forming a space for receiving a rotor of the motor.

Preferably, the arc surfaces are coaxial to each other.

Preferably, the extension parts comprise a middle extension part extending from a middle position of the main part, and two side extension parts respectively extending from opposite ends of the main part.

Preferably, the middle extension part is shorter than the side extension parts.

Preferably, the width of the middle extension part is substantially equal to the widths of the side extension parts added together.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
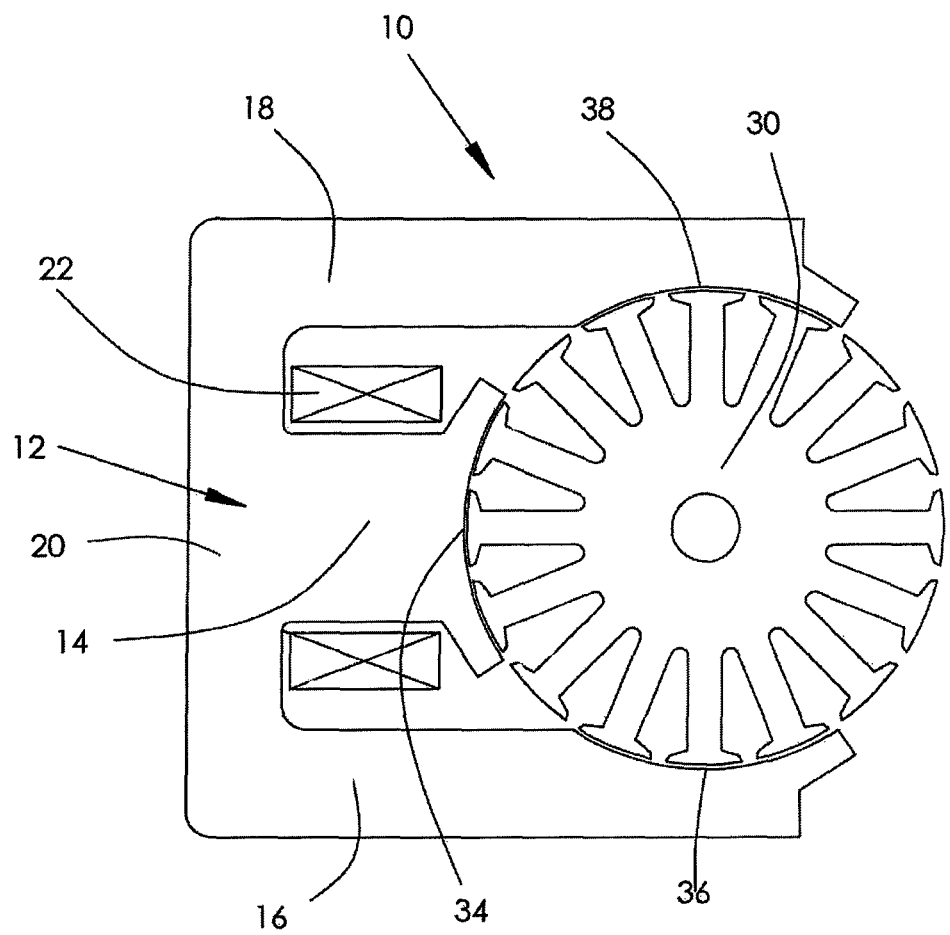
FIG. 1 is a cross-sectional view of a universal motor in accordance with an embodiment of the present invention.

As shown in FIG. 1, a universal motor in accordance with an embodiment of the present invention comprises a stator 10 and a rotor 30 rotatable relative to the stator 10. The stator 10 comprises a stator core 12 and a winding formed by a single coil 22 wound on the stator core 12. The stator core 12 has an E-shape cross section and comprises a main part 20 and three extension parts 14, 16 and 18 extending from the main part 20 in the same direction perpendicular to the main part 20. A middle extension part 14 extends from a middle position of the main part 20. The two side extension parts 16, 18 extend from opposite ends of the main part 20. The middle extension part 14 is shorter than the two side extension parts 16 and 18, measured in the extending direction. The width of the middle extension part 14 is substantially equal to the width of the two side extension parts added together. Preferably, the two side extension parts 16, 18 have the same width. The distances between the middle extension part 14 and the side extension parts 16 and 18 are the same. Each extension part has an arc surface 34, 36, 38, formed at a distal end portion thereof. The arc surfaces cooperatively form a space for receiving the rotor 30 therein. Preferably, the arc surfaces are coaxial with the rotor 30, and thus each other, and the distances from the center of the rotor 30 to the arc surfaces are the same. The coil 22 is disposed about the middle extension part 124. When the winding is electrified, a magnetic field passes through the middle extension part 14, two side extension parts 16, 18, and the rotor 30. Thus, a four-pole motor is formed by a non-enclosed stator core.

Preferably, the distal end of the middle extension part 14 forms a salient pole with a pole shoe extending in the circumferential direction of the rotor 30. The distal end portions of the side extension parts 16 and 18 respectively form non-salient poles. Alternatively, the ends of all extension parts 14, 16 and 18 may form non-salient poles.

Figure 2:
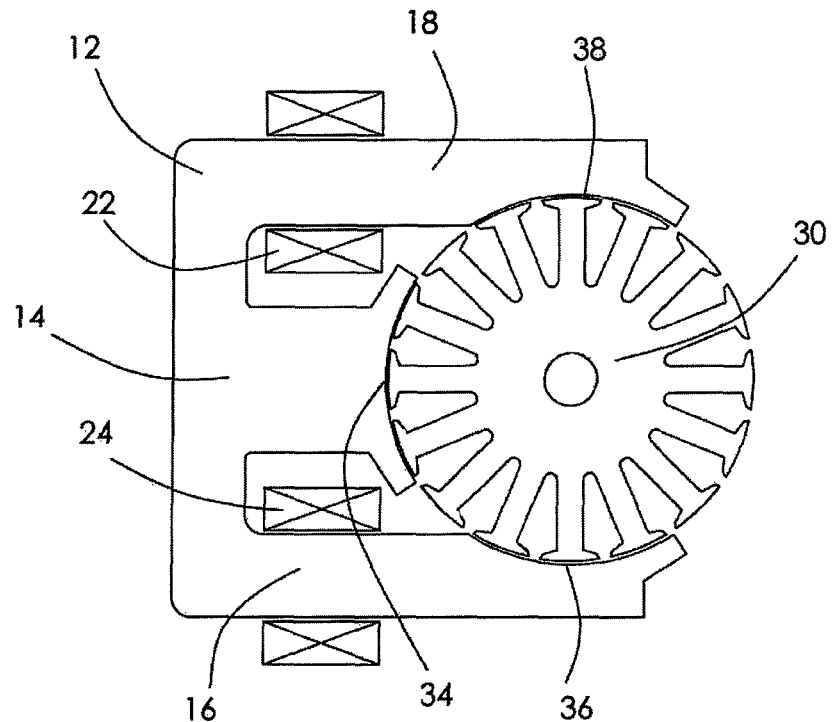
FIG. 2 is a cross-sectional view of a universal motor in accordance with an alternative embodiment of the present invention.
Figure 3:
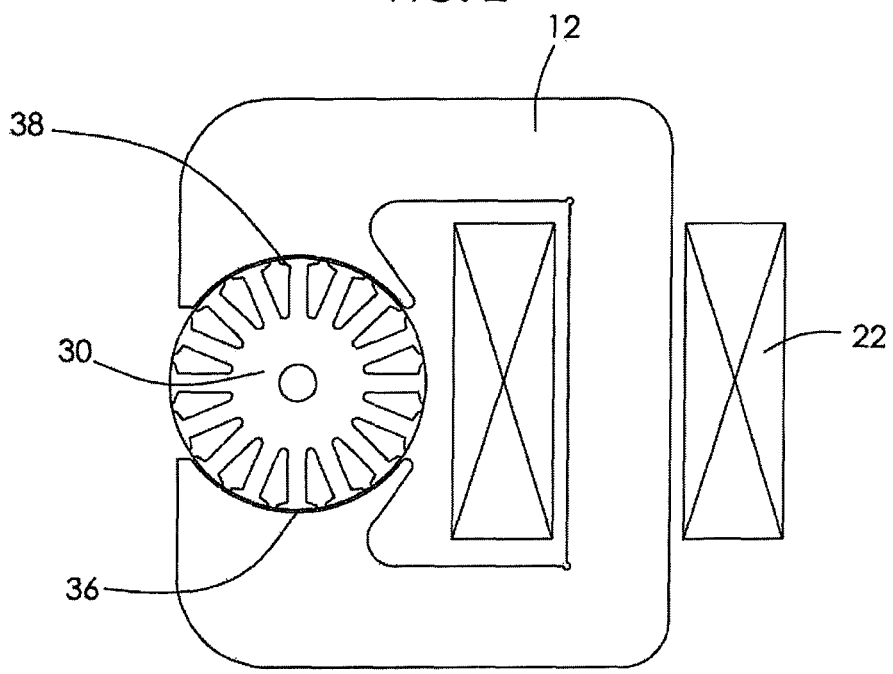
FIG. 3 a cross-sectional view of a conventional universal motor.

FIG. 2 shows a universal motor in accordance with an alternative embodiment of the present invention. The stator core of the motor according to this alternative embodiment is similar to the stator core shown in FIG. 1. The winding is formed by two coils 22, 24 which are respectively disposed on the two side extension parts 16, 18. The motor may selectively form a four-pole motor or a two-pole motor by changing the electrical connections to the two coils 22, 24 of the winding.

When the coils are connected so as to produce parallel magnetic fields, i.e., arc surfaces 36 and 38 have the same polarity simultaneously, the motor operates as a four pole motor with the arc surfaces 36 and 38 forming a pair of like stator poles and arc surface 34 forming a stator pole with opposite polarity.

When the coils are connected so as to produce anti-parallel magnetic fields, i.e., arc surfaces 36 and 38 simultaneously have opposite poles, the motor operates as a two pole motor with the arc surfaces 36 and 38 forming the two stator poles and the arc surface 34 remaining neutral.

The two coils may be wound on bobbins which are then slipped over the side extension parts to ease forming the windings. Alternatively the coils may be directly wound on the stator core with a thin layer of insulation in between.

The E-shape stator core allows the shaft of the motor to be located closer to a wall of an appliance with only the radius of the rotor being the limiting factor as the stator core does not fully enclose the rotor. This is of benefit for users of a four pole universal motor. The stator core also allows the motor, in some embodiments, to be operated selectively as either a two pole or a four pole motor, thus providing different output features in a single motor.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A universal motor comprising:
 a stator comprising a stator core and a winding wound on the stator core; and
 a rotor rotatable relative to the stator;
 wherein the stator core has an E-shape cross section and comprises a main part and three extension parts extending from the main part in the same direction, each extension part having an arc surface, the arc surfaces of the three extension parts of the E-shaped stator core cooperatively forming a space into which the rotor is received, the arc surface of each extension part extending along a periphery of the space,
 wherein the winding is wound on one or more of the extension parts; and
 wherein the extension parts comprise a middle extension part extending from a middle position of the main part, and two side extension parts respectively extending from opposite ends of the main part, and the diameter of the rotor is greater than the width of the middle extension part in a direction from one of the ends of the main part to the other end.

2. The universal motor of claim 1, wherein the arc surfaces are coaxial with the rotor.

3. The universal motor of claim 1, wherein the winding is a single coil disposed about the middle extension part.

4. The universal motor of claim 1, wherein the winding comprises two coils respectively disposed about the side extension parts.

5. The universal motor of claim 1, wherein the middle extension part is shorter than the side extension parts.

6. The universal motor of claim 1, wherein the width of the middle extension part is substantially equal to the widths of the side extension parts added together.

7. The universal motor of claim 1, wherein the periphery of the space opposing the middle extension part is open.

8. The universal motor of claim 1, wherein a distal end of the middle extension part forms a salient pole with a pole shoe extending in a circumferential direction of the rotor, the width of the pole shoe in the circumferential direction of the rotor being larger than other portions of the middle extension.

9. The universal motor of claim 1, wherein in said direction the diameter of the rotor is greater than the distance formed between portions of the side extension parts adjacent the main part.

10. A stator core for a universal motor, comprising a main part and three extension parts extending from the main part in the same direction and giving the stator core an E-shape cross section, each extension part having an arc surface, the arc surfaces of the E-shaped stator core cooperatively forming a space for receiving a rotor of the motor, the arc surface of each extension part extending along a periphery of the space, wherein the extension parts comprise a middle extension part extending from a middle position of the main part, and two side extension parts respectively extending from opposite ends of the main part, the arc surfaces of the two side extension parts being disposed at opposite sides of the arc surface of the middle extension part in a direction from one of said ends of the main part to the other of said ends thereof.

11. The stator core of claim 10, wherein the arc surfaces are coaxial to each other.

12. The stator core of claim 10, wherein the middle extension part is shorter than the side extension parts.

13. The stator core of claim 10, wherein the width of the middle extension part is substantially equal to the widths of the side extension parts added together.

14. The stator core of claim 10, wherein the periphery of the space opposing the middle extension part is open.

15. The stator core of claim 10, wherein the farthest distance between the arc surfaces of the side extension parts is greater than the width of the middle extension part in said direction.

16. The stator core of claim 10, wherein the arc surfaces of the two side extension parts are diametrically disposed at opposite sides of the space.

* * * * *